US008107981B2

(12) United States Patent
Byun et al.

(10) Patent No.: US 8,107,981 B2
(45) Date of Patent: Jan. 31, 2012

(54) WIRELESS NETWORK INTERFERENCE MANAGEMENT USING GEOGRAPHIC DATA

(75) Inventors: Jungsub Byun, San Ramon, CA (US); Zhi Li, San Ramon, CA (US); Raghvendra Savoor, Martinez, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 218 days.

(21) Appl. No.: 12/645,092

(22) Filed: Dec. 22, 2009

(65) Prior Publication Data

US 2011/0151864 A1 Jun. 23, 2011

(51) Int. Cl.
*H04W 88/02* (2009.01)

(52) U.S. Cl. .................................................. 455/466
(58) Field of Classification Search .......... 455/437–444, 455/426.1, 455, 466
See application file for complete search history.

(56) References Cited

U.S. PATENT DOCUMENTS

| | | | |
|---|---|---|---|
| 5,805,446 A * | 9/1998 | Hatakeyama et al. | 700/28 |
| 2005/0101290 A1* | 5/2005 | Melgosa | 455/406 |
| 2007/0287473 A1* | 12/2007 | Dupray | 455/456.1 |

* cited by examiner

*Primary Examiner* — Diane Mizrahi
(74) *Attorney, Agent, or Firm* — Parks IP Law LLC; Mickki D. Murray, Esq.

(57) ABSTRACT

An interference management system of a wireless network provider using geographic data and network information to recommend and/or facilitate transfer of services to an alternative connection.

22 Claims, 8 Drawing Sheets

WIRELESS NETWORK INTERFERENCE MANAGEMENT USING GEOGRAPHIC DATA

TECHNICAL FIELD

The present disclosure relates generally to wireless communications and, more particularly, to control of one or more wireless network resources using geographic data.

BACKGROUND

Wireless communications providers strive to provide robust and reliable service to their subscribers. Despite best efforts on the part of the providers, however, providing reliable service in some locations within a service area can be problematic. Service reliability in these locations can be compromised due to, for example, low signal levels, network resource scarcity, and interference introduced by land topology, physical obstructions, a large volume of transient subscribers, and sources of radio interference specific to a given location.

For example, a tall building or other obstruction in an urban area can block the propagation of radio signals, causing an area of low or no signal proximate to the obstruction. Similar issues can be caused by hilly or mountainous terrain. Multipath fading can be caused by reflection of radio waves off of multiple obstructions. Network resource scarcity can be caused by an abnormally large numbers of transient subscribers entering an area, or an inability on the part of the service provider to add additional resources due to legal and/or technical reasons (such as, for example, legal hurdles to building a new base station/cellular tower).

Locations where low performance may be experienced by a subscriber are referred to generally herein as "dead zones", and can also be referred to as "coverage holes", or "no-service areas". Wireless providers attempt to minimize these areas, but often there are still locations in a coverage area where a subscriber may experience dropped calls or other access failures. As used herein, a dropped call is an unexpected termination of a voice call due to technical reasons. Although these problematic locations are generally isolated pockets within a larger service area, subscribers attempting to access the network in these locations can find the user experience to be less than optimal

SUMMARY

The present disclosure relates to a system including a cellular communication network and an interference management system that includes a signal coverage map and a dead zone analysis module, where the interference management system can direct one or more network elements to transfer a service between a mobile device and the cellular communication network from the cellular communication network to an alternative connection device.

In another aspect, the present disclosure relates to a method including monitoring a performance characteristic of a wireless voice call connection between a mobile device and a cellular network, monitoring available alternative connections, and requesting a handoff of the voice call from the cellular network to an available alternative connection based at least in part on data available at an interference management system.

In another aspect, the present disclosure relates to a computer-readable medium encoded with instructions operable to cause data processing apparatus to monitor a performance characteristic of a wireless voice call connection between a mobile device and a cellular network, monitor available alternative connections, and request a handoff of the voice call from the cellular network to an available alternative connection based at least in part on data available at an interference management system.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

Overview of the Disclosure

In various embodiments, the present disclosure describes a wireless communication system incorporating an interference management system and methods related thereto. In some embodiments, the interference management system models radio wave propagation based on geographic information to, for example, base network operation in whole or in part on the resulting model or models.

Interference Management System

Figure 1:
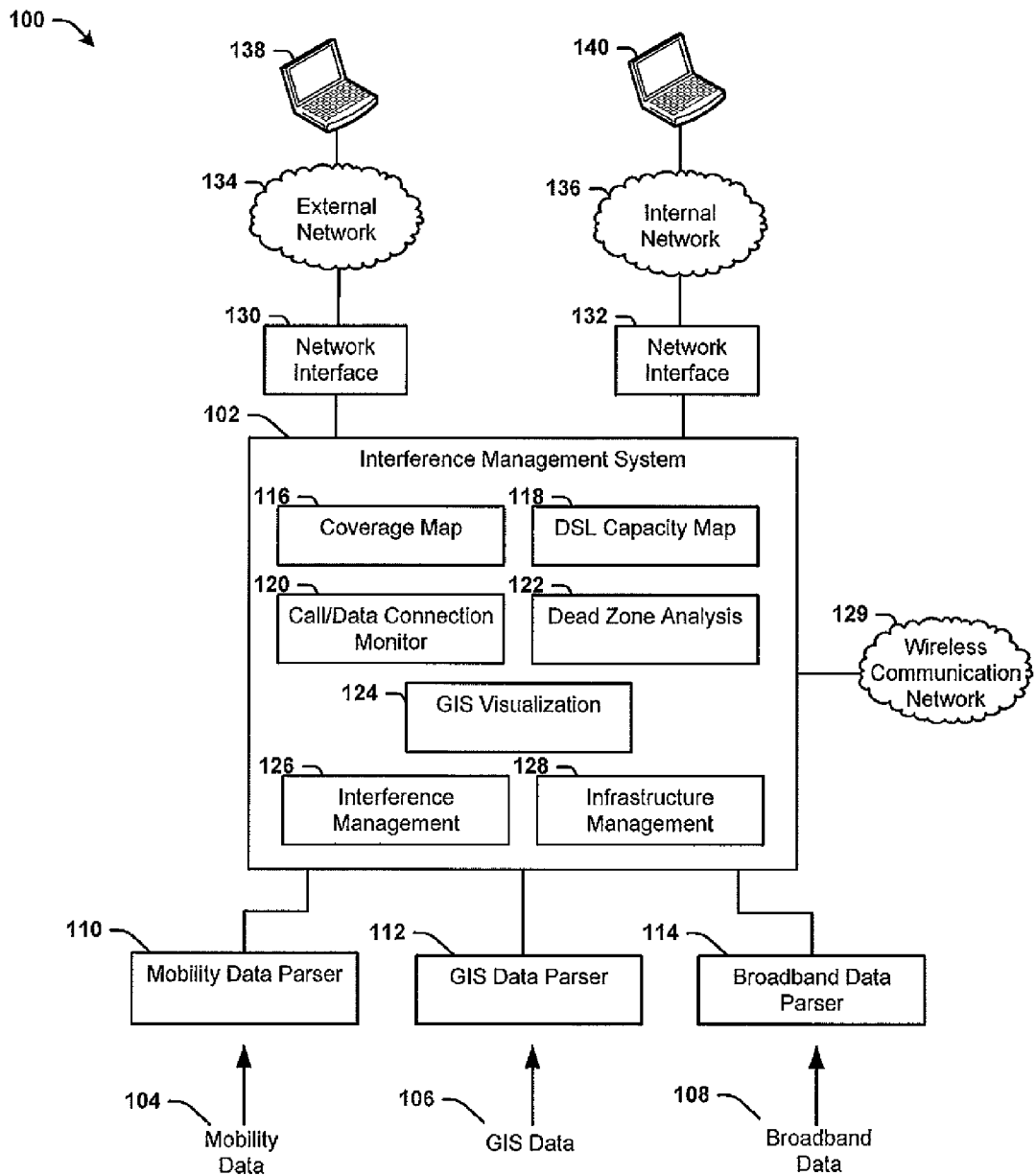
FIG. 1 illustrates a schematic block diagram of an exemplary environment of an interference management system.

Now turning to the figures, and more particularly to the first figure, FIG. 1 illustrates a schematic block diagram of an exemplary environment 100 of an interference management system 102 for use in accordance with embodiments of the present disclosure.

The interference management system 102 includes, in some embodiments, a server or multiple co-located or distributed servers. Data from multiple sources can be provided to and/or accessed by the interference management system 102. For example, mobility data 104, geographic information system (GIS) data 106, and broadband data 108 can be provided to respective data parsing modules 110, 112, and 114. Parsing modules are configured to, for example, retrieve, process, and/or format data for use by the interference management system 102. In some embodiments, one or more parsing modules are configured to accept and process data from multiple sources. For example, in one embodiment, a single parsing module is configured to accept and process mobility data 104, GIS data 106, and broadband data 108.

Mobility data 104 includes, for example, data related to mobile device performance on a given network. Such data can include, for example, (i) wireless signal parameters recorded in the field by testing devices, (ii) one or more locations at which the measurement(s) were made, (iii) call record data including, but not limited to, signal levels measured at mobile devices, (iv) location(s) of devices making measurements, (v) identification of one or more base stations being received at a mobile device, (vi) call duration data, (vii) dropped call data (as detected by, for example a mobile device, a wireless network with which a mobile device was communicating, or subscriber complaints), (viii) dropped data connection information, (ix) base station traffic load data, and (x) quality of service data. In general, mobility data 104 can include any data relating to performance of a wireless network. In many respects, the description below focuses primarily on analysis and provisioning of voice call services, however, it should be understood these techniques can also be applied to the analysis and control of data services.

GIS data 106 includes data relating to physical characteristics of a wireless network. For example, GIS data 106 can include (i) locations (e.g., latitude and longitude) of base stations, or other nodes of the wireless network, (ii) antenna configurations (e.g., antenna type, height, azimuth, shape) of base stations or other network nodes, (iii) power output of base stations or other network notes, (iv) topography of a wireless service area, (v) location and physical characteristics of structures in a wireless service area (e.g., buildings, trees), (vi) location of potential sources of interference (base stations of another provider, television transmitters, and power transmission lines, for example), (vii) locations of WiFi access points, (viii) areas of high traffic demand (voice and/or data), and (ix) other radio wave propagation modeling information.

Broadband data 108 includes data relating to characteristics of a wired broadband network. For example, broadband data 108 can include (i) DSL bandwidth/capacity, (ii) optical fiber bandwidth/capacity, (iii) coaxial cable bandwidth/capacity, (iv) backhaul costing, (v) broadband network service performance data, and (vi) other parameters relating to performance and use of one or more elements of a wired network.

Some or all of the data from the data sources 104, 106, and 108 can be loaded into one or more data stores (not shown in detail) of the interference management system 102. Alternatively or in addition, some or all of the data from the data sources 104, 106, and 108 can be accessed by the interference management system 102 from external sources.

The data retrieved from the data sources 104, 106, and 108 and/or external sources can be used by the interference management system 102 to generate one or more maps and/or models for use in providing wireless communication services to subscribers. For example, the data can be used to generate a wireless coverage map 116, and a DSL capacity map 118.

The interference management system 102 includes a call/data connection monitor module 120 configured to collect and monitor mobile device uplink and downlink performance. Monitored performance parameters can include, for example, signal to noise ratio, energy per chip to interference spectral density, packet loss, latency, throughput, and voice mean opinion score. The interference management system 102 also includes a dead zone analysis module 122 configured to use identify potentially problematic areas where, for example, calls might be dropped or wireless service quality could otherwise be compromised. The dead zone analysis module 122 can use mobile device performance data (signal-to-noise ratios experienced at a given location, for example), geographic information, radio propagation models, dropped call reports, and other information available at the interference management system 102 to identify these areas. In some embodiments, a threshold for dropped calls is set such that more dropped calls than the threshold amount in a given area results in that area being designated as a dead zone. In some embodiments, a threshold for signal-to-noise ratio is set such that a signal-to-noise ratio less than this threshold being measured at a given area results in that area being designated as a dead zone.

In some embodiments, GIS data 106 is used to generate corresponding radio frequency propagation parameters for use in a propagation model. For example, the GIS data, including, for example, the locations and dimensions of multiple buildings in a given area (an urban area, for example) can be used by one or more modules of the interference management system 102 (the dead zone analysis module 122, for example) in identifying potential problematic areas and/or dead zones within a wireless coverage area.

The interference management system 102 further includes a GIS visualization module 124 configured to generate one or more interactive maps suitable for display on, for example, a computer monitor. In some embodiments, these maps display data received from the data sources 104, 106, and 108, and/or information derived from this data by one or more modules of the interference management system 102. For example, a map can be generated that shows characteristics of a given geographical area within a wireless service area. Such a map can include, for example, landmarks (e.g., roadways, city names, bodies of water) and land topology, overlaid with information regarding wireless service in that geographic area. For example, the map can include measured and/or theoretical wireless signal strengths in the area, base station locations, and potentially problematic areas where performance of the wireless network might be compromised. In addition, the map can include WiFi access points. In some implementations, the interference management system 102 includes a map interface (not shown) allowing a user to selectively display all, some, or none of these wireless network characteristics on a map display. An example interactive map is described below with reference to FIG. 2.

The interference management system 102 also includes an interference module 126 and an infrastructure management module 128. These modules 126, 128 are configured to use the information available at the interference management system 102 to instruct one or more elements in a wireless communication system 129 and/or a combined wireless/wired broadband network to perform one or more steps to improve wireless service. The interference management module 126 directs the operation of the elements of the wireless network in order to manage the physical layer to reduce interference and improve signal-to-noise ratios. The infrastructure management module directs the operation of network elements to reduce network congestion/overloading to improve service performance.

For example, a voice call on a mobile device that is at or near an identified dead zone can be transferred (handed off) to alternative network resources to prevent the voice call from being dropped. Examples of such operations are further described below with reference to FIGS. 3-6. An example mobile device than can be used in conjunction with the described systems and methods is described below with reference to FIG. 7. Example elements of a wireless communication system 129 are further described below with reference to FIG. 8.

In some embodiments, the interference management system 102 can include network interfaces 130, 132 connected to an external network 134 and an internal network 136, respectively. In some embodiments, the network interfaces 130, 132 include components (not shown in detail) such as, for example, a web server, web pages, and one or more web applications (e.g., Java applications). An external user computer 138 can access the interference management system 102 through the external network 134. An internal user computer 138 can access the interference management system 102 through the internal network 136.

A graphical interface (an example of which is described below) provided through the network interface 130 or 132 can be accessed by users to view, add, and/or edit data available at the interference management system 102.

Example Graphical Display and Interface

Figure 2:
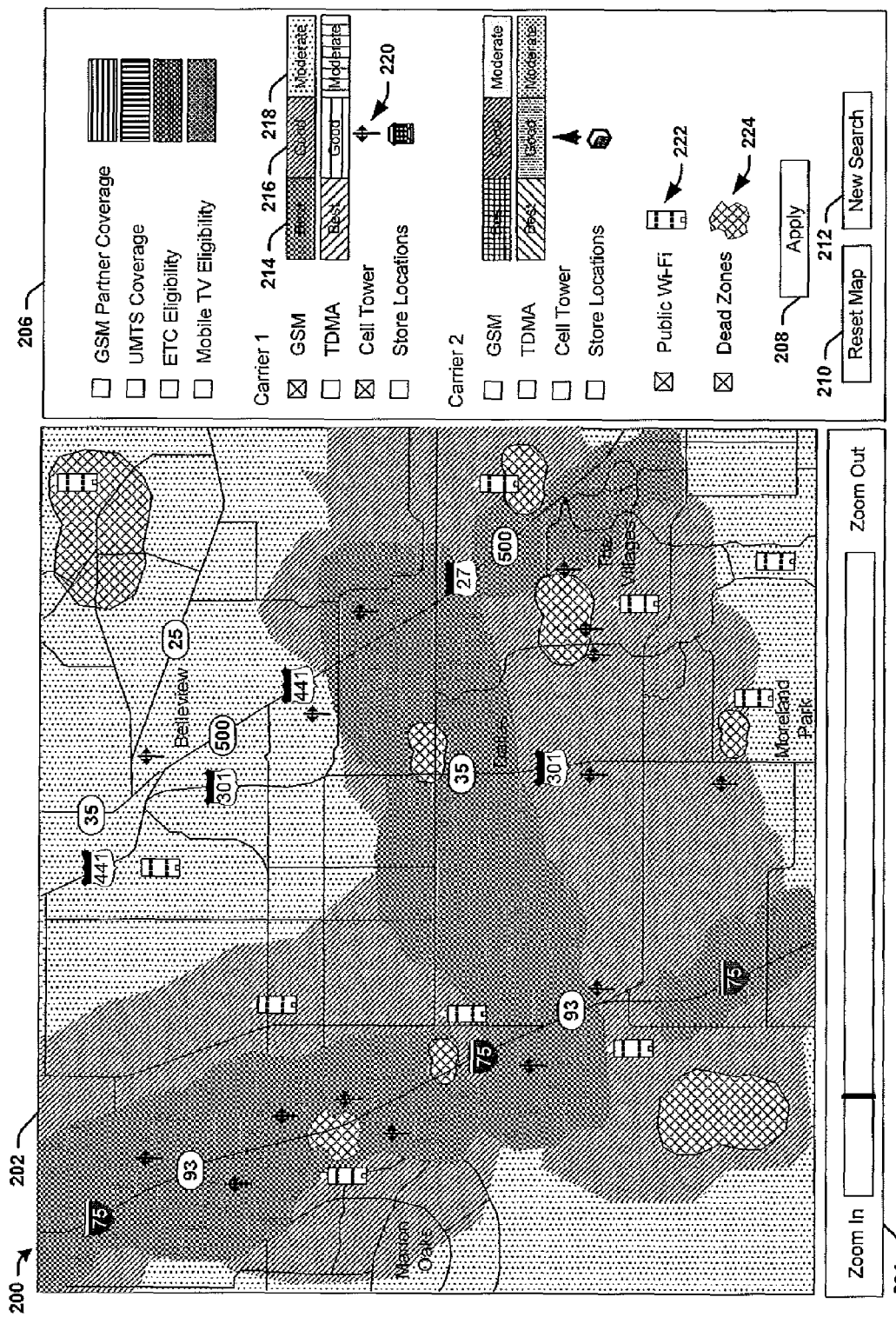
FIG. 2 illustrates an exemplary graphical interface of an interference management system.

FIG. 2 illustrates an exemplary graphical interface 200 of the interference management system 102. The graphical interface 200 can be provided to client devices 138 and 140 over the network interfaces 130 and 132, respectively. It should be understood that some features such as the ability to add, delete, and/or edit data in using the graphical interface 200 may be limited depending on the network over which the graphical interface 200 is being served (e.g., the external network 134 or the internal network 136). Features of the graphical interface 200 may also be limited based on user log in credentials and permissions.

The graphical interface 200 includes an interactive map section 202 displaying information available at the interference management system 102. In some embodiments, the interference management system 102 is configured so that a user can, for example, manipulate the interactive map section 202 using an input device (e.g., mouse, keyboard, and/or touch screen). For example, a user at a client device (such as client device 138 or 140) can reposition a view shown in the interactive map 202 by selecting (e.g., clicking with a mouse) and moving the map view (e.g., by moving the mouse) to reposition the map view. In some embodiments, the graphical interface 200 includes selection buttons or areas (not shown) that, when selected by the user, cause the map view to move incrementally to the north, south, east, west, northeast, etc. In some embodiments, the graphical interface 200 is configured to allow a user to select a location (e.g., identify an address, landmark, or latitude and longitude) to reposition the map view. The map view shown in the interactive map section 202 can also include zoom controls, such as a slider bar 204.

The interactive map 202 also includes a user selection pane 206 by which a user can choose types of data to be displayed on the interactive map 202. In some embodiments, the user selection pane 206 includes controls (e.g., check boxes, radio buttons, selection buttons, drop down selection boxes, etc.) for choosing which data of the data available at the interference management system 102 is displayed on the interactive map 202 at any given time.

In the example view shown in FIG. 2, the interactive map 202 includes information for Global System for Mobile communications (GSM) coverage information and signal strength for a first carrier, cell tower locations for the same carrier, public WiFi locations, and identified dead zones. This displayed data corresponds with the user selections shown in the selection pane 206. Checkboxes next to each of these options are shown as having been selected by a user. Selection of these options cause the interactive map 202 to display the corresponding data.

In some embodiments, the selection pane 206 includes an "Apply" button 208, a "Reset Map" button 210, and/or a "New Search" button 212. The interactive map 202 can be updated upon a change in any selections of the selection pane 206, or alternatively, when the "Apply" button 208 is selected. Selection of the "Reset Map" button 210 can cause the information shown on the map to be cleared. Selection of the "New Search" button 212 can, for example, cause a form field to be displayed for entering a new location (e.g., latitude and longitude, address, landmark) to be shown in the interactive map 202.

The selection pane 206 can also serve as a legend for the interactive map. Options in the selection pane 206 can include corresponding graphics or icons that indicate how data will be graphically displayed on the interactive map 202 if the option is selected for display. For example, the "GSM" coverage option in the selection pane 206 includes three graphics 214, 216, and 218 for displaying respective GSM signal strengths in the interactive map 202. The three graphics can, for example, have different shades of a similar color. In the interactive map 202, these colors indicate relative GSM signal levels for locations covered by that color/shade on the interactive map 202. In some embodiments, there can be more than three graphics/levels of shading for indicating signal levels.

The cell tower icon 220 indicates the location of cell towers for the first carrier on the interactive map 202. The public WiFi icon 222 indicates the location of public WiFi access points (or "hot spots"). These WiFi access points may be access points installed by and under the control and/or supervision of a wireless carrier. The WiFi access points may be installed at business or retail offices owned and/or operated by business partners of a wireless service provider. For example, the WiFi access points may be installed at coffee shops, bookstores, and fast food restaurants.

The dead zone graphic 224 indicates the location of actual and/or potential dead zones identified by the interference management system through uploaded data and/or signal propagation models based on some or part of this data (e.g., from the data sources 104, 106, 108). In one contemplated embodiment, the dead zone graphic 224 includes multiple categories for identifying various types of dead zones. For example, in one embodiment, the dead zone graphic 224 includes one visual indication for actual, already identified, dead zones and one visual indication for potential dead zones. The underlying data used to display the dead zone areas is in any form sufficient to identify a geographic region, such as by including coordinate boundaries and/or a center point with a radius.

GSM signal levels are shown on the interactive map 202 as an example, and coverage maps for any wireless protocol can be displayed in the same manner. In some embodiments, the selection pane 206 can include display options for multiple carriers. This can be helpful if, for example, one carrier is considering the purchase of some or all of another carrier's assets and/or has just completed such a purchase.

In some embodiments, a user of the computer 138 can access the interference management system 102 to enter data. This entered data can be added to the information already available at the interference management system as received from data sources 104, 106, 108. For example, a wireless subscriber can access the interference management system 102 to input data regarding a dropped call (e.g., location, time, etc.). In some embodiments, a location of a dropped call can be entered by clicking on the location of the dropped call on the interactive map 202.

In some embodiments, a user of the computer 140 can access to the interference management system 102 to enter, delete, update, and/or edit data. These actions can add to or manipulate the information already available at the interference management system as received from data sources 104, 106, 108. For example, an employee of a wireless service provider can access the interference management system 102 to input data regarding a dropped call (e.g., location, time, etc.). In some embodiments, a location of a dropped call can be entered by clicking on the location of the dropped call on the interactive map 202.

In some embodiments, boundaries of a service area and/or dead zone can be clicked and dragged to change their respective shape. In some embodiments, the locations of cell towers, WiFi locations, and other elements can be entered, deleted, updated, and/or edited at least in part through user interaction with the interactive map 202.

The data available at and/or generated by the interference management system 102 can be used in provisioning network services to improve wireless service reliability. For example, alternative connection options can be identified for a wireless subscriber based on the subscriber's current location and/or current performance characteristics of the wireless communication system 129, including actual signals strengths and dead zones and/or estimated or potential problem areas. Where alternative connections are available, service can be transferred (e.g., a mobile voice call can be handed off to an alternative connection). Further examples of how the interference management system 102 can improve reliability in the provision of service to the subscriber, and thus the subscriber experience, will be described below.

Use of Alternative Connections

Wireless service providers have placed broadband access points (e.g., WiFi access points) in various residential and/or commercial areas. These access points provide a broadband connection for mobile devices to the Internet over DSL, coaxial cable (e.g., cable modems), passive optical networks, T1, T3, or other broadband network connections. In addition, many mobile devices include a short range wireless transceiver (e.g., WiFi, Bluetooth, etc.) in addition to a transceiver used for cellular communication. The broadband access points operated by a wireless service provider and the local wireless transceivers (e.g., WiFi, Bluetooth) included in many mobile devices, serve as alternative connections for mobile devices that are in or near identified dead zones.

If, for example, the location of a mobile device and/or the status of its connection to the cellular network indicates that the device is in jeopardy of dropping a voice call, the mobile device can be instructed to (and/or already include instructions for) switching to a WiFi access point. An existing voice call can be handed off to a WiFi connection and continued without interruption using voice over internet protocol (VoIP).

Use of such alternative connections can help to reduce dropped calls. The use of alternative connections in or near dead zones can be, for example, particularly effective in urban areas where tall buildings can block signals and cause multipath signal fading. This makes dead zones more likely, but an urban area is also more likely to have a nearby local wireless technology (e.g., WiFi, Bluetooth) access point that can be utilized as an alternative connection.

Figure 3:
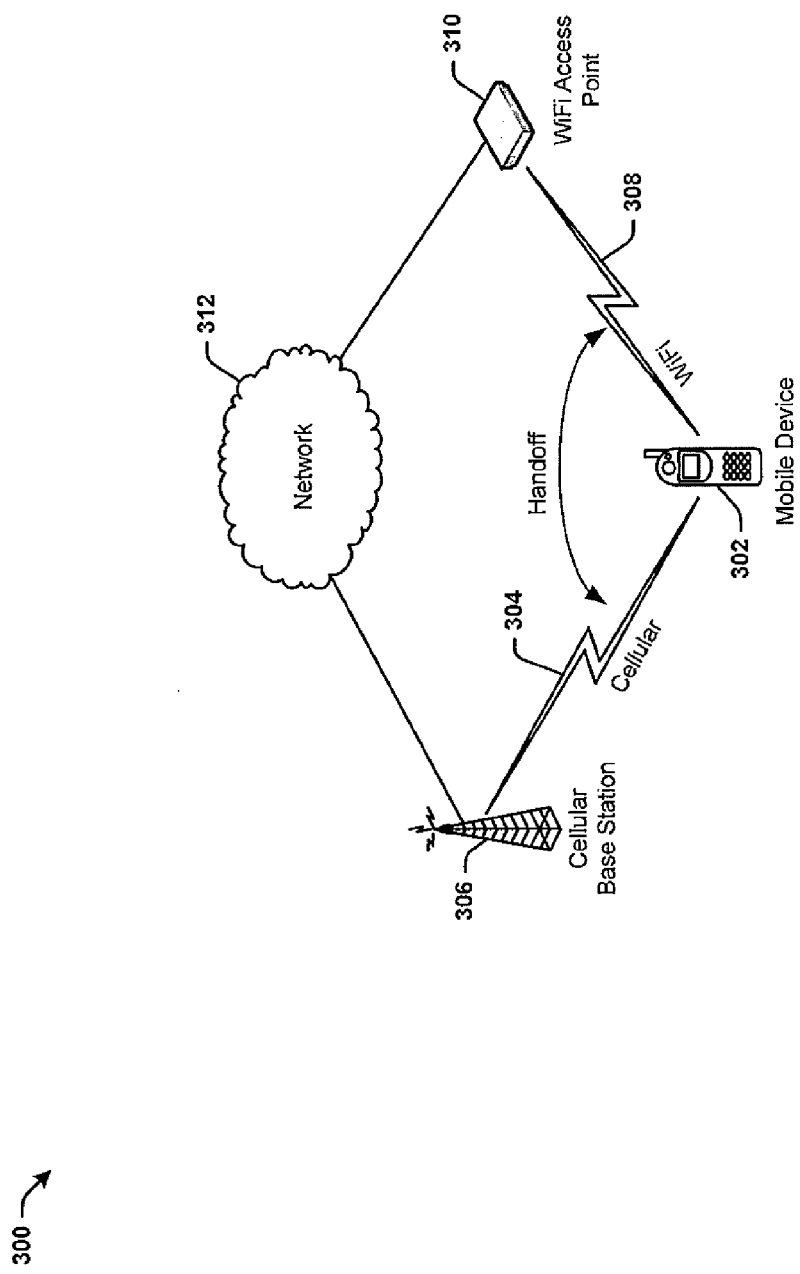
FIG. 3 illustrates a schematic block diagram of an exemplary handoff of a cellular voice call to a broadband network.

FIG. 3 illustrates a schematic block diagram 300 of an exemplary handoff of a cellular voice call to a broadband network. Consider a mobile device 302 having an established cellular connection 304 to a cellular base station 306. To maintain an acceptable level of service (e.g., voice service) to the mobile device 302, a voice call (and/or in some embodiments other wireless services) can be handed off to a nearby alternative connection such as the WiFi access point 310. In some embodiments, for example, if one or more performance parameters of the connection 304 decreases to or below a minimum acceptable threshold, a handoff procedure is performed. In some embodiments, if a location of the mobile device 302 (as determined, for example, from a GPS unit of the mobile device 302 and/or signal timing/triangulation techniques), when compared to data of the interference management system 102, indicates that the mobile device is in or near an identified or potential dead zone, the handoff procedure can be performed.

A WiFi connection 308 between the mobile device 302 and the access point 310 can be established, and services can be delivered to the mobile device 302. For example, a voice call in progress can be handed off to the WiFi access point 310 to maintain the continuity of the call. Voice data between the mobile device 302 and the wireless service provider can be transferred over a broadband network 312 using VoIP.

Figure 4:
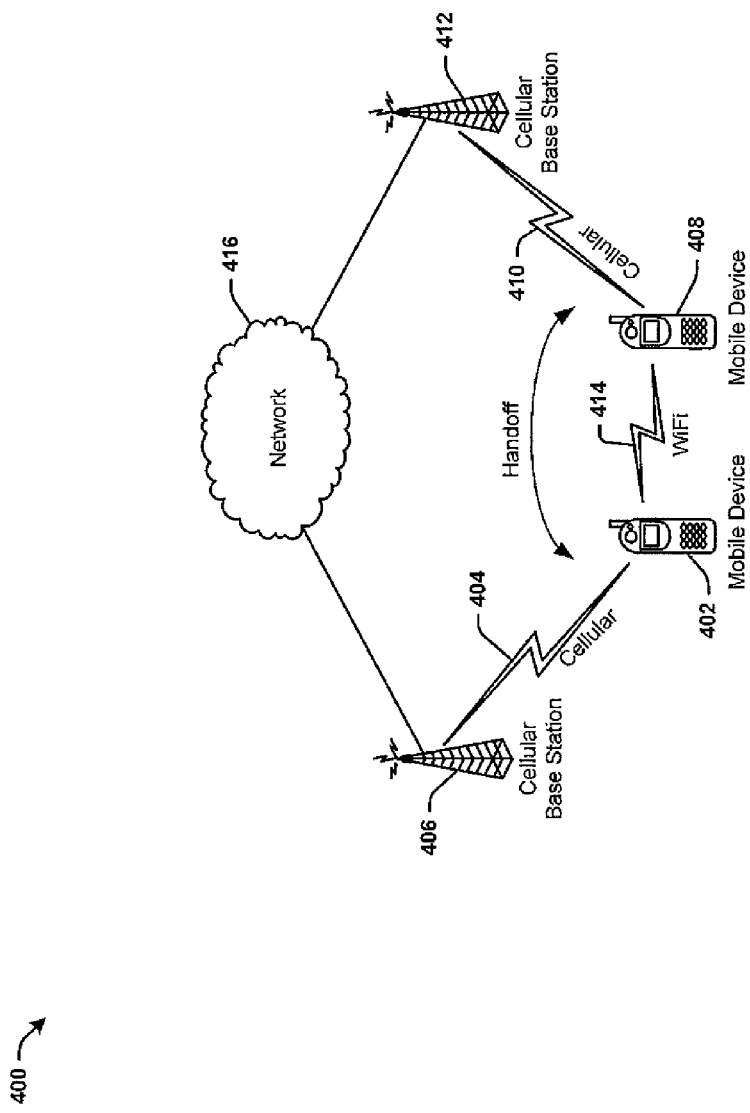
FIG. 4 illustrates a schematic block diagram of an exemplary handoff of a cellular voice call through a WiFi connection of an intermediate mobile device.

FIG. 4 illustrates a schematic block diagram 400 of an exemplary handoff of a cellular voice call through a WiFi connection of an intermediate mobile device. Consider a primary mobile device 402 having an established cellular connection 404 to a cellular base station 406. To maintain an acceptable level of service (e.g., voice service) to the mobile device 402, a voice call (and/or in some embodiments other wireless services) can be handed off to a nearby alternative connection such as the WiFi transceiver of a second mobile device 408 having a cellular connection to the cellular base station 412.

In some embodiments, the interference management system 102 is configured so that if, for example, one or more performance parameters of the connection 404 decreases to or below a minimum acceptable threshold, the interference management system 102 initiates a handoff procedure. Alternatively, or in addition, if a location of the mobile device 402 (as determined, for example, from a GPS unit of the mobile device 402 and/or signal timing/triangulation techniques), when compared to data of the interference management system 102.

Once a connection (e.g., a WiFi connection) 414 between the primary mobile device 402 and the intermediate mobile device 408 is established, services can be delivered to the primary mobile device 402. For example, a voice call in progress can be handed off to the WiFi connection 414. In some embodiments, voice data between the primary mobile device 402 and the wireless service provider is transferred through the intermediate mobile device 408 using VoIP. This data can be relayed by the intermediate mobile device 408 to the cellular base station 412 which can send this data over a broadband network 416 to the appropriate elements of the wireless network. It should be understood that the intermediate mobile device 408 could have an established connection with the cellular base station 406 (i.e., the same base station that the primary mobile device 402 was previously connected to). The interference management system 102 may initiate a handoff from the first connection 404 to the second connection 410, 414 for various reasons, such as in response to determining that a connection between the second mobile device 408 and the first cellular base station 406 is, or is expected to become, more reliable than the connection 404 between the first mobile device 402 and first the base station 406.

Figure 5:
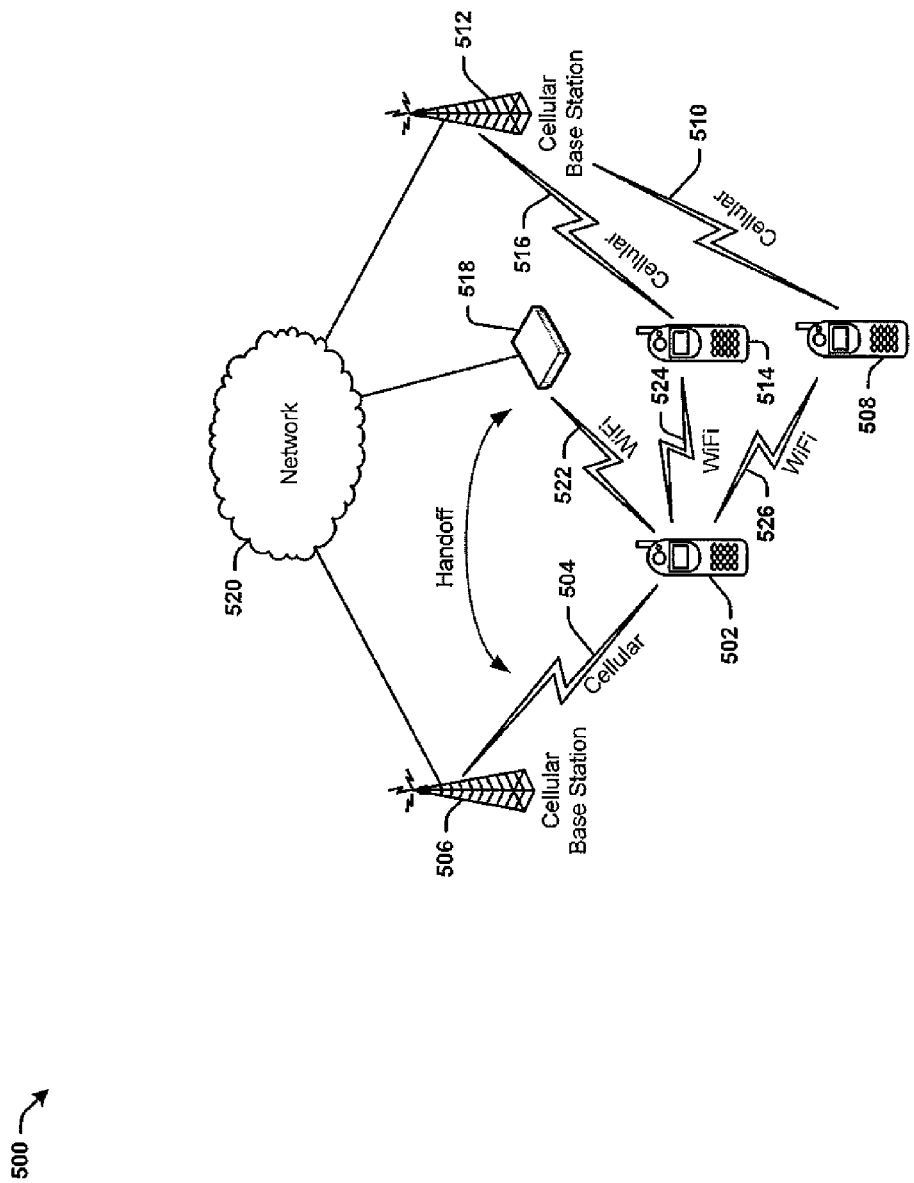
FIG. 5 illustrates a schematic block diagram of an exemplary handoff of a cellular voice call to multiplexed hybrid connections.

FIG. 5 illustrates a schematic block diagram 500 of an exemplary handoff of a cellular voice call to multiplexed hybrid connections. Consider a mobile device 502 having an established cellular connection 504 to a cellular base station 506. To maintain an acceptable level of service (e.g., voice service) to the mobile device 502, a voice call (and/or in some embodiments other wireless services) can be handed off to two or more nearby alternative connections such as a WiFi access point 518, the WiFi transceiver of a second mobile device 508, and/or the WiFi transceiver of a third mobile device 514. The second mobile device 508 and third mobile device 514 have respective cellular connections 510, 516 to a cellular base station 512. In some embodiments, the second mobile device 508 and third mobile device 514 are connected to different cellular base stations.

In some embodiments, the interference management system 102 is configured so that if, for example, one or more performance parameters of the connection 504 decreases to or below a minimum acceptable threshold, the interference management system 102 initiates a handoff procedure. Alternatively, or in addition, if a location of the mobile device 502 (as determined, for example, from a GPS unit of the mobile device 502 and/or signal timing/triangulation techniques), when compared to data of the interference management system 102, indicates that the mobile device is in or near an identified dead zone, the handoff procedure can be performed.

For example, a voice call in progress can be handed off to two or more of the WiFi connections 522, 524, 526. Voice data between the mobile device 502 and the wireless service provider can be transferred to and from the multiple intermediate devices using VoIP.

The mobile device 502 can use two or more of these alternative connections to multiplex voice data using VoIP to/from the wireless service provider. The mobile device 502 can be configured to encode VoIP traffic using forward error correction (FEC) protocols so that the data transferred through multiple devices can be properly reassembled by the wireless service provider. VoIP traffic to the mobile device 502 can be similarly encoded so that the mobile device 502 can properly reassemble the data.

The interference management system 102 can identify, monitor, and/or provision potential alternative connections, and/or provide alternative connection recommendations to a mobile device. Recommendations can be based on, for example, connection load and/or performance of the alternative connection options. Recommendations differ from instructions (i.e. commands) in that logic in a mobile device can make the final determination as to which alternative connection(s) will be used, and, in some embodiments, whether a handoff is performed at all. Throughout the handoff procedures described in FIGS. 3, 4, and 5, the interference management system 102 can support the handover process. Alternatively, or in addition, mobile devices in the wireless communication system can be configured to monitor possible alternative connections such as nearby WiFi access points and/or other WiFi enabled mobile devices. Upon the detection of degraded cellular connection performance, the mobile device can initiate a handoff event. The handoff event can be facilitated by the wireless communication system.

In some embodiments, a handoff is initiated by a mobile device upon information being received at the mobile device indicating that is in or near an identified dead zone, the signal-to-noise ratio for the mobile device uplink or downlink has failed below a minimum acceptable threshold, and/or measured throughput has decreased below a minimum acceptable threshold.

In some embodiments, a handoff is initiated by the interference management system 102 upon information being at the interference management system 102 that the location of a given mobile device is in or near an identified dead zone, the signal-to-noise ratio for the mobile device uplink or downlink has failed below a minimum acceptable threshold, and/or measured throughput has decreased below a minimum acceptable threshold.

Figure 6:
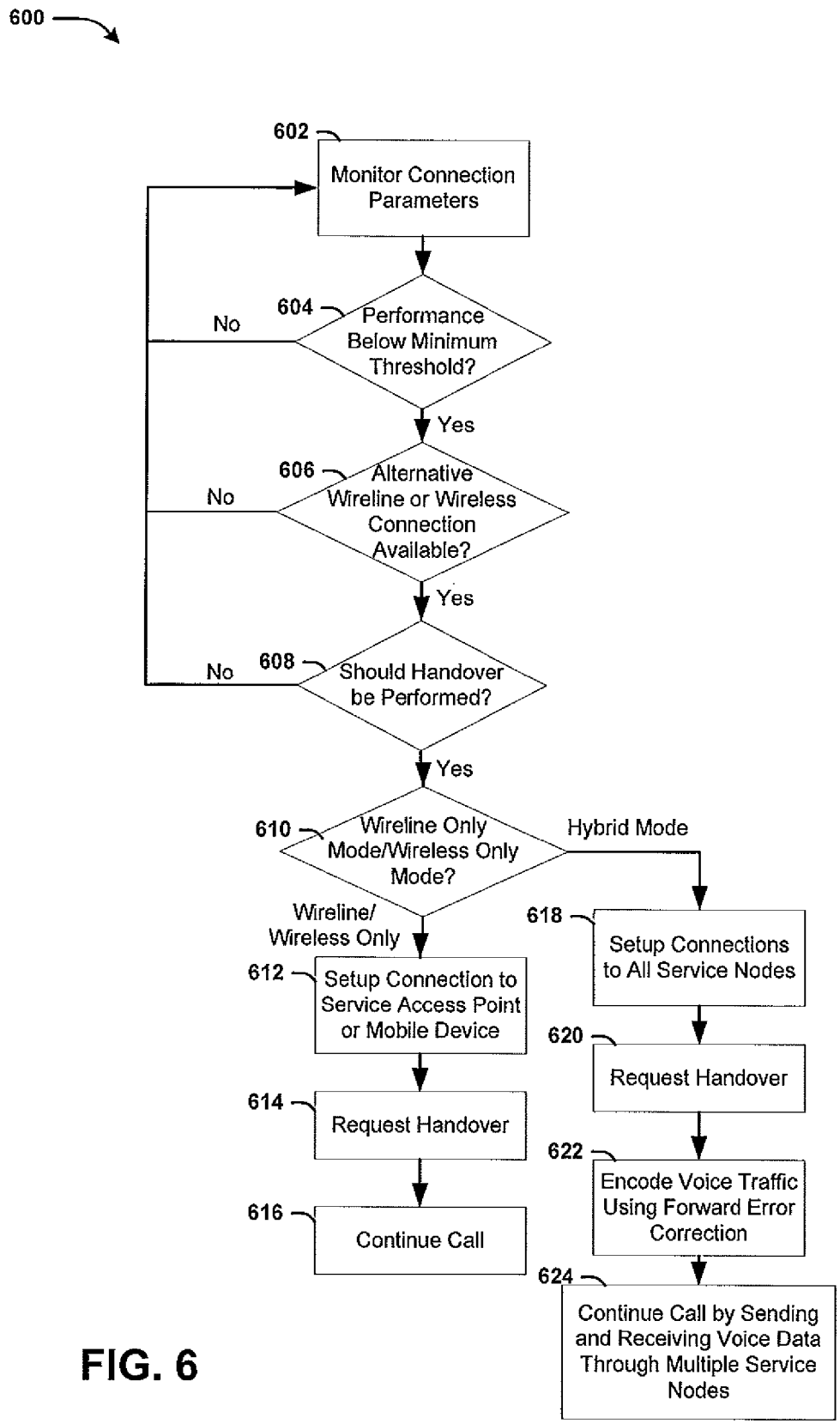
FIG. 6 shows an exemplary method for routing voice data based on an interference management analysis, according to an embodiment of the present disclosure.

FIG. 6 shows an exemplary method 600 for routing voice data based on an interference management analysis, according to an embodiment of the present disclosure. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. In certain embodiments, some or all steps of this process, and/or substantially equivalent steps are performed by execution of computer-readable instructions stored or included on a computer readable medium, such as the memory 706 of the mobile device 700 (described below in connection with FIG. 7) and/or a memory module of a location server or mobile locating platform, for example.

The method 600 begins and flow proceeds to block 602, where one or more connection parameters are monitored. This monitoring can be performed by an interference management system 102 and/or a mobile device. Connection parameters can include the location of a mobile device using the connection. The method proceeds to decision block 604 where one or more connection parameters are compared to respective minimum performance thresholds. If the performance of the connection is superior to the minimum thresholds, the method returns to block 602.

If one or more connection parameters do not meet the minimum performance thresholds, the method proceeds to decision block 606 where a check is performed to determine if any alternative wireline or wireless connection options are available. If no alternative connection options are available, the method returns to block 602.

If alternative connection options are available, the method proceeds to decision block 608 where a check is performed to determine if a handoff should be performed. This check can include a determination of whether or not a handoff mode is enabled and/or whether the resulting alternative connection would be superior to the current connection. If a handoff should not be performed the method returns to block 602. If a handoff should be performed, the method proceeds to decision block 610.

At decision block 610 it is determined whether the handoff should be to a single wireline or wireless alternative connection or to multiple alternative connections. This determination can include, for example, whether or not a single alternative connection available to a mobile device has sufficient capacity and/or performance to handle the required traffic load. If it is determined that a single wireline or wireless device should be used as the alternative connection, the method proceeds to block 612.

At block 612, a connection is established with the selected alternative access device. The method proceeds to block 614 where a handoff is requested. For example, a mobile device can request the wireless communication network to handoff a voice call after the alternative connection is established. The method proceeds to block 616 where the handoff is performed and the voice call is continued.

If, at block 610, it is determined that multiple alternative connections should be used the method proceeds to block 618. At block 618, multiple connections are established with two or more of the selected alternative access devices. The method proceeds to block 620 where a handoff is requested. For example, a mobile device can request the wireless communication network to handoff a voice call after the alternative connections are established. The method proceeds to block 622 where voice traffic is encoded using forward error correction. The method proceeds to block 624 where the handoff is performed and the voice call is continued.

Mobile Device Overview

Figure 7:
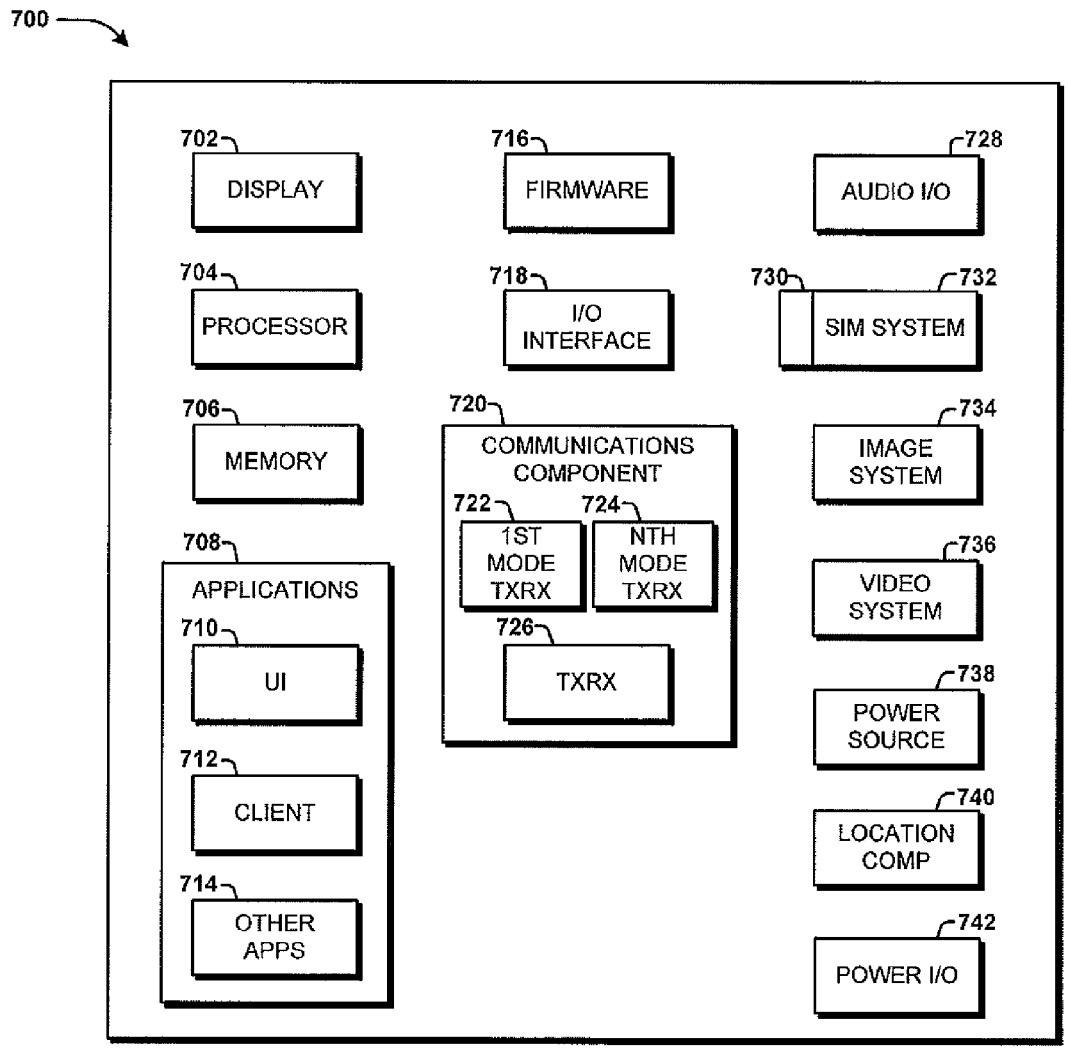
FIG. 7 illustrates an exemplary mobile device and components thereof, according to an embodiment of the present disclosure.

FIG. 7 illustrates a schematic block diagram of an exemplary mobile device 700 for use in accordance with embodiments of the present disclosure. The mobile device 700 may be, for example, a smart phone or dedicated navigation device.

Although connections are not shown between all of the components illustrated in FIG. 7, the components can interact with each other to carry out device functions. In some embodiments, for example, the components are arranged so as to communicate via one or more busses (not shown). It should be understood that FIG. 7 and the following description are intended to provide a general understanding of a suitable environment in which the various aspects of some embodiments of the present disclosure can be implemented.

In some embodiments, the mobile device 700 is a multi-mode handset and has a variety of computer readable media, including, for example, volatile media, non-volatile media, removable media, and non-removable media. The term "computer-readable media" and variants thereof, as used in the specification and claims, refers to storage media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 700.

As illustrated in FIG. 7, the mobile device 700 includes a display 702 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like. The illustrated mobile device 700 also includes a processor 704 for controlling, processing data, and/or executing computer-executable instructions of one or more applications, and a memory 706 for storing data and/or one or more applications 708. In some embodiments, the memory 706 stores information associated with determining location of the mobile device 700 according the methods described herein. For example, the memory 706 may store information including user preference factors and/or administrative factors set by an administrator, manufacturer, or service provider, which are described in more detail below.

In some embodiments, the application(s) 708 include a user interface (UI) application 710. The UI application 710 interfaces with a client 712 (e.g., an operating system (OS)) to facilitate user interaction with device functionality and data. In some embodiments, the client 712 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems are contemplated.

The UI application 710 aids the user in entering message content, viewing received messages, answering/initiating calls, entering/deleting data, entering and setting user IDs and passwords, configuring settings, manipulating address book content and/or settings, interacting with other applications 714, and the like. In some embodiments, the other applications 714 include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like. The applications 708 are stored in the memory 706 and/or in a firmware 716, and can be executed by the processor 704. The firmware 716 can also store code for execution during device 700 power up, for example.

The illustrated mobile device 700 also includes an input/output (I/O) interface 718 for input/output of data, such as, for example, user IDs, passwords, and application initiation (start-up) requests. In some embodiments, the I/O interface 718 is a hardwire connection, such as, for example, a USB, mini-USB, audio jack, PS2, IEEE 1394, serial, parallel, Ethernet (RJ48) port, RJ11 port, or the like. In some embodiments, the I/O interface 718 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 718 can be used for communications between the mobile device 700 and a network or local device, instead of, or in addition to, a communications component 720.

The communications component 720 interfaces with the processor 704 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 720 includes a multimode communications subsystem for providing cellular communications via different cellular technologies. In some embodiments, for example, a first cellular transceiver 722 operates in one mode, such as, GSM, and an Nth cellular transceiver 724 operates in a different mode, such as Universal Mobile Telecommunications System (UMTS). While only two cellular transceivers 722, 724 are illustrated, the mobile device 700 may include more than two transceivers.

The illustrated communications component 720 also includes a transceiver 726 for use by other communications technologies such as, for example, WIFI, WIMAX, BLUETOOTH, infrared, infrared data association (IRDA), near field communications (NFC), RF, and the like. In some embodiments, the communications component 720 also facilitate reception from terrestrial radio networks, digital satellite radio networks, Internet-based radio services networks, combinations thereof, and the like. The communications component 720 can process data from a network such as, for example, the Internet, an intranet, a home broadband network, a WIFI hotspot, and the like, via an ISP, DSL provider, or broadband provider.

In some embodiments of the present invention, audio capabilities for the mobile device 700 are provided by an audio I/O component 728 including a speaker to output audio signals and a microphone to receive audio signals.

The illustrated mobile device 700 also includes a slot interface 730 for accommodating a subscriber identity system 732 such as, for example, a subscriber identity module (SIM) card, a universal SIM (USIM) card, or a universal integrated circuit card (UICC). Alternatively, the subscriber identity system 732 can be manufactured into the device 700, thereby obviating the need for a slot interface 730. In some embodiments, the subscriber identity system 732 stores information associated with determining location of the mobile device 700 according to the methods described herein. For example, the subscriber identity system 732 may store information including user preference factors and/or administrative factors set by an administrator, manufacturer, or service provider, which are described in more detail below. In some embodiments, the subscriber identity system 732 is programmed by a manufacturer, a retailer, a user, a computer, a network operator, or the like.

The illustrated mobile device 700 also includes an image capture and processing system 734 (image system). Photos can be obtained via an associated image capture subsystem of the image system 734, for example, a camera. The illustrated mobile device 700 also includes a video system 736 for capturing, processing, recording, modifying, and/or transmitting video content.

The illustrated mobile device 700 also includes a power source 738, such as batteries and/or other power subsystem (AC or DC). The power source 738 can interface with an external power system or charging equipment via a power I/O component 739.

The illustrated mobile device 700 also includes a location component 740 for use in determining geographic location of the mobile device 700. The location component 742 may include, for example, a GPS receiver.

Communications Network

Figure 8:
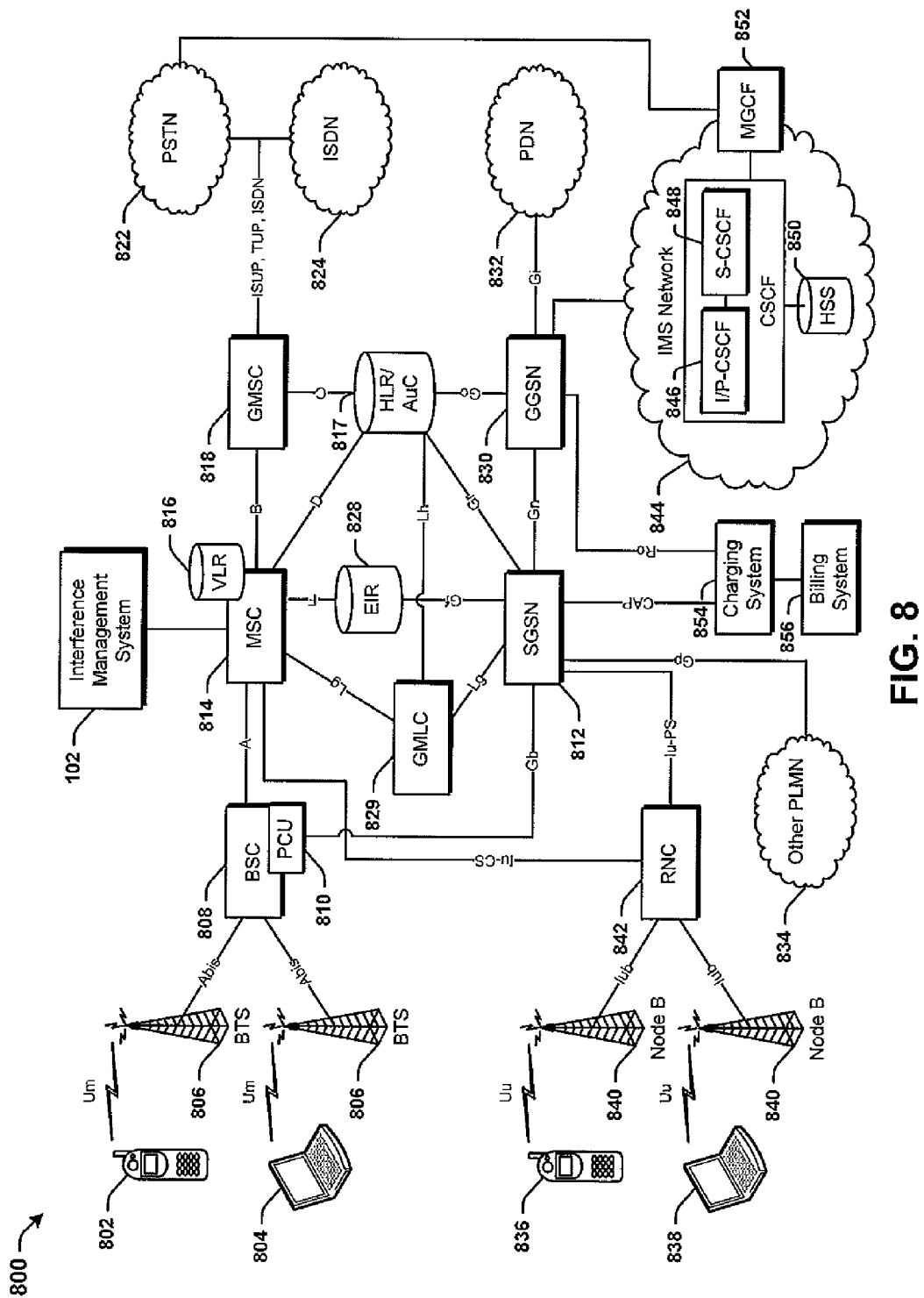
FIG. 8 illustrates an exemplary network including an interference management system, according to an embodiment of the present disclosure.

FIG. 8 illustrates an exemplary network 800 including an interference management system 102, according to an embodiment of the present disclosure.

The wireless communications network 800 includes an interference management system 102 as described above. In some embodiments, the wireless communications network 800 includes two radio access networks (RANs). A first RAN, illustrated in the upper left hand portion of FIG. 8, is dedicated to GSM-based network access. A second RAN, illustrated in the lower left hand portion of FIG. 8, is dedicated to UMTS-based network access. The innovative aspects of the present disclosure may be implemented in alternative networks that use other access technologies, as described above. The first RAN is now described.

The illustrated communications network 800 includes a first Mobile Station (MS) 802 and a second MS 804 that are each in communication with a Base Transceiver Station (BTS) 806 via the Um radio (air) interface. The BTSs 806 are terminating nodes for the radio interface in the illustrated first RAN. Each BTS 806 includes one or more transceivers and is responsible for ciphering of the radio interface.

In the illustrated embodiment, the first MS 802 is a mobile device, such as the mobile device 700, described above with reference to FIG. 7, and the second MS 804 is a portable computer, such as a laptop with an integrated or external, removable GSM access card. Each MS 802, 804 includes mobile equipment, such as, but not limited to, keyboards, screens, touch screens, multi-touch screens, radio transceivers, circuit boards, processors, memory, a SIM, USIM, or UICC that contains subscriber information to enable network access to the wireless telecommunications network 800, and the like.

Each BTS 806 is in communication with a Base Station Controller (BSC) 808 via an Abis interface. Typically, a BSC has tens or even hundreds of BTSs under its control. The BSC 808 is configured to allocate radio resources to the MSs 802, 804, administer frequencies, and control handovers between BTSs 806 (except in the case of an inter-Mobile Switching Center (MSC) handover in which case control is in part the responsibility of the MSC). One function of the BSC 808 is to act as a concentrator, so that many different low capacity connections to the BTS 806 become reduced to a smaller number of connections towards the MSC. Generally, this means that networks are often structured to have many BSCs 808 distributed into regions near the BTSs 806 and connected to large centralized MSC sites. Although illustrated as a distinct element, the functions provided by the BSC 808 may alternatively be incorporated in the BTS 806 and, in such a configuration, the Abis interface is eliminated.

The BSC 808 is logically associated with a Packet Control Unit (PCU) 810 when GPRS capabilities are employed. The PCU 810 is configured to support radio related aspects of GPRS when connected to a GSM network. The PCU 810 is in communication with a Serving GPRS Support Node (SGSN) 812 via a Gb interface. The SGSN 812 records and tracks the location of each mobile device (e.g., MSs 802, 804) in the wireless telecommunications network 200. The SGSN 812 also provides security functions and access control functions.

The BSC 808 is also in communication with an MSC 814 via an A interface. The MSC 814 is configured to function as a telecommunications switch. The MSC 814 is in communication with location databases, such as a Visiting Location Register (VLR) 816 and a Home Location Register (HLR) 817. The VLR 816 may be logically associated with the MSC 814 as illustrated or may be provided as a separate network element. The VLR 816 is a database configured to store all subscriber data that is required for call processing and mobility management for mobile subscribers that are currently located in an area controlled by the VLR 816.

The HLR 817 is in communication with the MSC 814 and VLR 816 via the D interface. The HLR 817 is a database configured to provide routing information for mobile terminated calls and various messaging communications. The HLR 817 is also configured to maintain subscriber data that is distributed to the relevant VLR (e.g., the VLR 816) or the SGSN 812 through the attach process and to provide mobility management procedures, such as location area and routing area updates. The HLR 817 may be logically associated with an Authentication Center (AuC) as illustrated, or the AuC may be provided as a separate network element. The AuC is configured to authenticate each UICC/SIM/USIM/X-SIM that attempts to connect to the wireless telecommunications network 800, for example, when a mobile device is powered on. Once authenticated, the HLR 817 is allowed to manage the UICC/SIM/USIM/X-SIM and services provided to the MS 802, 804. The AuC also is capable of generating an encryption key that is used to encrypt all wireless communications between the MS 802, 804 and the communications network 800.

The MSC 814 is also in communication with a Gateway MSC (GMSC) 818 via a B interface. The GMSC 818 is configured to provide an edge function within a Public Land Mobile Network (PLMN). The GMSC 818 terminates signaling and traffic from a Public Switched Telephone Network (PSTN) 822 and an Integrated Service Digital Network (ISDN) 824, and converts the signaling and traffic to protocols employed by the mobile network. The GMSC 818 is in communication with the HLR/AuC 817 via a C interface to obtain routing information for mobile terminated calls originating from fixed network devices, such as landline telephones that are in communication with the mobile network via the PSTN 822, for example.

The MSC 814 is also in communication with an Equipment Identify Register (EIR) 828 via an F interface. The EIR 828 is a database that can be configured to identify subscriber devices that are permitted to access the wireless telecommunications network 800. An International Mobile Equipment Identity (IMEI) is a unique identifier that is allocated to each mobile device and is used to identify subscriber devices in the EIR 828. The IMEI includes a type approval code, a final assembly code, a serial number, and a spare digit. An IMEI is typically placed in the EIR 828 once its operation has been certified for the infrastructure of the network 800 in a laboratory or validation facility.

The SGSN 812 and the MSC 814 are also in communication with a gateway mobile location center (GMLC) 829 via an Lg interface. The GMLC 829 can communicate with the HLR/AuC 817 via an Lh interface to acquire routing information.

The EIR 828 and the HLR/AuC 817 are each in communication with the SGSN 812 via a Gf interface and a Gr interface, respectively. The SGSN 812, in turn, is in communication with a GGSN (Gateway GPRS Support Node) 830 via a Gn interface. The GGSN 830 is configured to provide an edge routing function within a GPRS network to external PDNs (Packet Data Networks) 832, such as the Internet and one or more intranets, for example. The GGSN 830 is in communication with the PDN 832 via a Gi interface. The GGSN 830 includes firewall and filtering functionality. The HLR/AuC 817 is in communication with the GGSN 830 via a Gc interface.

The SGSN 812 is also in communication with another PLMN 834 via an external GGSN (not shown). The external GGSN provides access to the other PLMN 834. The other PLMN 834 may be, for example, a foreign network, such as, a wireless telecommunications network operated by another wireless service provider (WSP) or the same WSP.

The second RAN, illustrated in the lower left hand portion of FIG. 8, is dedicated to UMTS-based network access and is now described. The illustrated wireless telecommunications network 800 also includes a first UE (User Equipment) 836 and a second UE 838 that are each in communication with a Node B 840 via a Uu radio (air) interface. The Node B 840 is the terminating node for the radio interface in the second RAN. Each Node B 840 includes one or more transceivers for transmission and reception of data across the Uu radio interface. Each Node B 840 is configured to apply codes to describe channels in a CDMA-based UMTS network. Generally, the Node B 840 performs similar functions for the UMTS network that the BTS 806 performs for the GSM network.

In the illustrated embodiment, the first UE 836 is a mobile phone, such as the mobile device 700, described above with reference to FIG. 7, and the second UE 838 is a portable computer, such as a laptop with an integrated or external, removable UMTS card. Each UE 836, 838 includes mobile equipment, such as keyboards, screens, touch screens, multi-touch screens, radio transceivers, circuit boards, processors, a UICC or USIM stand-alone that contains subscriber information to enable network access to the wireless telecommunications network 800, and the like. Generally, the UEs 836, 838 perform similar functions in the UMTS network that the MSs 802, 804 perform in the GSM network.

Each Node B 840 is in communication with a Radio Network Controller (RNC) 842 via a Iub interface. The RNC 842 is configured to allocate radio resources to the UEs 836, 838, administer frequencies, and control handovers between Node Bs 840 (and others not shown). Although illustrated as a distinct element, the RNC 842 functions may alternatively be located within the Node Bs 840. In this configuration the Iub interface is eliminated. Generally, the RNC 842 performs similar functions for the UMTS network that the BSC 808 performs for the GSM network.

The RNC 842 is in communication with the MSC 814 via an Iu-CS interface. The RNC 842 is also in communication with the SGSN 812 via an Iu-PS interface. The other network elements perform the same functions for the UMTS network as described above for the GSM network.

The communications network 800 also includes an IP Multimedia Subsystem (IMS) network 844. The IMS network 844 includes Call State Control Functions (CSCFs), such as, a Proxy-CSCF (P-CSCF), an Interrogating-CSCF (I-CSCF), and a Serving-CSCF (S-CSCF). The P-CSCF is a first contact point in the IMS network 844 for a UE 836, 838 and routes incoming communications to the I-CSCF. The I-CSCF determines which S-CSCF is serving the communication and routes the communication to that S-CSCF, which performs registration, session control, and application interface functions. The P-CSCF and the I-CSCF are illustrated as a combined I/P-CSCF 846 and the S-CSCF 848 is illustrated as a stand-alone element. Other CSCF configurations are contemplated.

The IMS network 844 also includes a Home Subscriber Server (HSS) 850, which is a master user database that supports the IMS network 844 core network elements. The HSS 850 stores subscription-related information, such as subscriber account details and subscriber profiles, performs authentication and authorization of the user, and provides information about a subscriber's location and IP address. It is similar to the GSM HLR and AuC, described above as the combination HLR/AuC 817.

The IMS network 844 also includes a Media Gateway Control Function (MGCF) 852, which provides call control protocol conversions between an ISDN User Part (ISUP) protocol used by the PSTN 822 and a Session Initiation Protocol (SIP) used by the IMS network 844.

Referring back to the SGSN 812, it is shown that the SGSN 812 is in communication with a charging system 854 via a CAP interface. The GGSN 930 is also in communication with the charging system 854, via an Ro interface. The charging system 854, in turn, is in communication with a billing system 856.

Briefly, the charging system 854 is responsible for offline and online charging of subscriber accounts. The charging system 854 may be deployed to provide charging rule functions for prepaid and/or postpaid network platforms and for agreements developed between a home network WSP and a foreign WSP, such as a temporary lease agreement, a temporary unlocking agreement, or a temporary roaming agreement. The single charging system 854 is illustrated for simplicity, however separate charging systems are contemplated and may be utilized if desired by the operating WSP. The billing system 856 is responsible for billing postpaid customers and handling payments received for service provisioned for both postpaid and prepaid accounts in the network 800. Like the charging system 854, the billing system 856 may alternatively be designed as two separate entities for postpaid and prepaid applications.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system comprising:
   a cellular communication network; and
   an interference management system configured to:
      determine whether to direct one or more elements of the cellular communication network to transfer a service being provided to a primary mobile device by the cellular communication network via an original route to an alternative route between the mobile device and the cellular communication network, the alternative route including an alternative connection device, the determination being based at least in part on geographic data available to the interference management system; and
      direct the one or more network elements to transfer the service based on the determination.

2. The system of claim 1, wherein the interface management system comprises:
   a dead zone analysis module configured to identify at least one dead zone, wherein the determination is based at least in part on a comparison of a location of the primary mobile device to a boundary of the at least one dead zone.

3. The system of claim 2, wherein the dead zone analysis module processes call record data to identify a location as a dead zone based on a threshold number of dropped calls of the call record data occurring proximate to the location.

4. The system of claim 2, wherein the dead zone analysis module processes call record data to identify a location as a dead zone based on a connection performance parameter falling below a minimum proximate to the location.

5. The system of claim 4, wherein the connection performance parameter is selected from the group consisting of throughput, signal-to-noise ratio, and voice mean opinion score.

6. The system of claim 2, wherein the interface management system further comprises:
   a connection monitor module configured to collect mobile device connection performance, wherein the dead zone analysis module processes output for the connection monitor module to identify a location as a dead zone.

7. The system of claim 1, wherein the interface management system further comprises:
   a connection monitor module configured to monitor mobile device connection performance, wherein the determination is based at least in part on a monitored performance parameter falling below a minimum acceptable threshold.

8. The system of claim 7, wherein the monitored performance parameter is selected from the group consisting of throughput, signal-to-noise ratio, and voice mean opinion score.

9. The system of claim 1, wherein:
   the alternative connection device is a wireless router connected to a broadband network; and
   the wireless router communicates wirelessly with the mobile device using a WiFi transceiver.

10. The system of claim 1, wherein the alternative connection device is an intermediate mobile device having a first transceiver and a second transceiver, the first transceiver communicating with the primary mobile device, and the second transceiver communicating with the cellular communication network.

11. The system of claim 1, wherein the interference management system directs the one or more network elements to transfer services based at least in part on a relative location of the mobile device and a boundary of a dead zone identified by a dead zone analysis module using the geographic data available at the interference management system.

12. The system of claim 1, wherein the interference management system directs the one or more network elements to transfer the service based at least in part on a signal performance parameter of a connection between the mobile device and the cellular network.

13. The system of claim 1, wherein the alternative route includes two or more alternative connection devices.

14. The system of claim 13, wherein the service is a voice call, and the primary mobile device is configured to multiplex voice data across the two or more alternative connection devices using voice over internet protocol.

15. The system of claim 14, wherein the primary mobile device is configured to encode the voice over internet protocol transmissions with forward error correction encoding.

16. The system of claim 1, wherein the interference management system further comprises a geographic data visualization module configured to generate an interactive map for display on a client device accessing the interference management system.

17. The system of claim 16, wherein the geographic data visualization module is further configured to update the interactive map based on inputs received from the client device.

18. The system of claim 16, wherein the interactive map includes representations of dead zones identified by a dead zone analysis module.

19. The system of claim 16, wherein the geographic data visualization module is further configured to update data used by the interference management system with data received from the client device, the data being received from the client through manipulation of the interactive map.

20. A method comprising:
- an interference management system monitoring a performance characteristic of a voice call on a cellular communication network;
- the interference management system monitoring one or more available alternative connections; and
- the interference management system requesting a transfer of the voice call from an original route between a mobile device and the cellular communication network to an alternative route between the mobile device and the cellular communication network using at least one of the available alternative connections based at least in part on data available to the interference management system.

21. The method of claim 20, wherein the transfer request is based at least in part on dead zone boundary data of the interference management system.

22. The method of claim 20, wherein the transfer request is based at least in part on a radio signal propagation model of the interference management system.

* * * * *